US008167165B1

(12) United States Patent
Peterson

(10) Patent No.: US 8,167,165 B1
(45) Date of Patent: May 1, 2012

(54) THERMAL COVER DEVICE FOR COFFEE PRESS

(76) Inventor: David A. Peterson, San Jose, CA (US)

( * ) Notice: Subject to any disclaimer, the term of this patent is extended or adjusted under 35 U.S.C. 154(b) by 136 days.

(21) Appl. No.: 12/778,973

(22) Filed: May 12, 2010

(51) Int. Cl.
*B65D 25/00* (2006.01)
(52) U.S. Cl. .................... 220/739; 220/592.24; 150/165
(58) Field of Classification Search ............. 220/592.24, 220/592.26, 737, 739; 150/154, 165, 601, 150/901; 99/287, 297
See application file for complete search history.

(56) References Cited

U.S. PATENT DOCUMENTS

| | | |
|---|---|---|
| 5,570,623 A | 11/1996 | Lin |
| 5,680,944 A | 10/1997 | Rueter |
| 5,809,867 A | 9/1998 | Turner et al. |
| 6,079,316 A | 6/2000 | Barden et al. |
| 6,295,920 B1 | 10/2001 | Barden et al. |
| D498,644 S | 11/2004 | Root et al. |

*Primary Examiner* — Harry Grosso

(57) ABSTRACT

A thermal cover device for a coffee press featuring an elongated panel for wrapping around the coffee press, wherein a first attachment means is disposed on the panel for securing the panel around the coffee press and a first slot disposed in the side of the panel sized to accommodate a handle of the coffee press; and a circular top panel adapted to be attached to a top of the coffee press, wherein a second slot is disposed in the circular panel for accommodating a lid handle disposed the top of the coffee press; wherein the panel and top panel are constructed from a first batting layer and a second batting layer sandwiched between outer layers, wherein an insulation layer is sandwiched between the first batting layer and the second batting layer, the insulation layer is constructed from an EagleShield™ insulation component.

4 Claims, 2 Drawing Sheets

THERMAL COVER DEVICE FOR COFFEE PRESS

FIELD OF THE INVENTION

The present invention is directed to coffee maker accessories, more particularly to an insulation device for coffee presses.

BACKGROUND OF THE INVENTION

After just a short period of time, coffee or tea in a coffee press can become cold. The present invention features a thermal cover device for such coffee presses. The device of the present invention helps keep the coffee or tea hot after the hot water is poured into the press for brewing purposes. This can help prevent the user from having to reheat the coffee or tea in a microwave, which may affect the flavor. The device may be kept on the French press during serving or while the pot is waiting.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
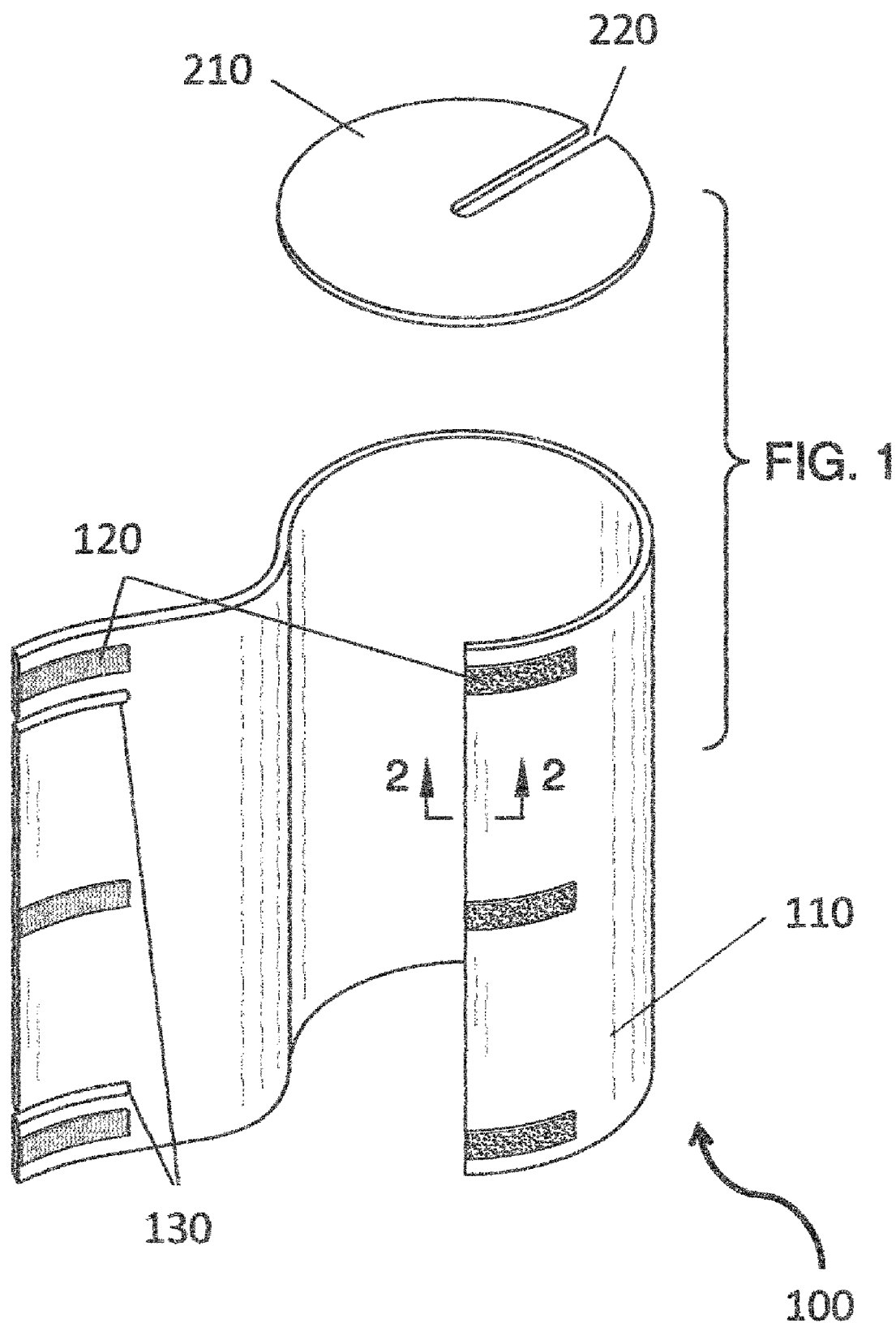
FIG. 1 is an exploded view of the thermal cover device of the present invention.
Figure 2:
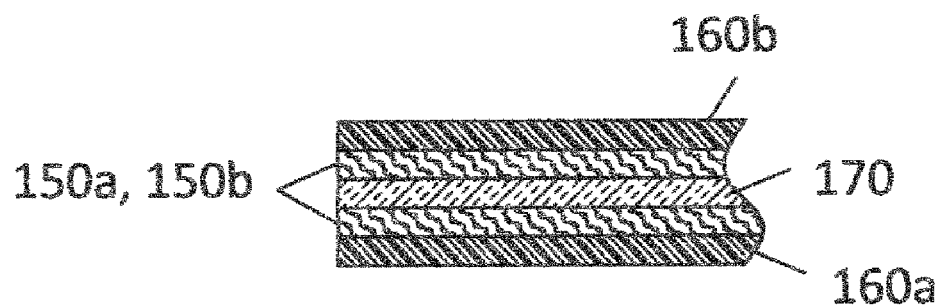
FIG. 2 is a cross sectional view of the thermal cover device of FIG. 1.
Figure 3:
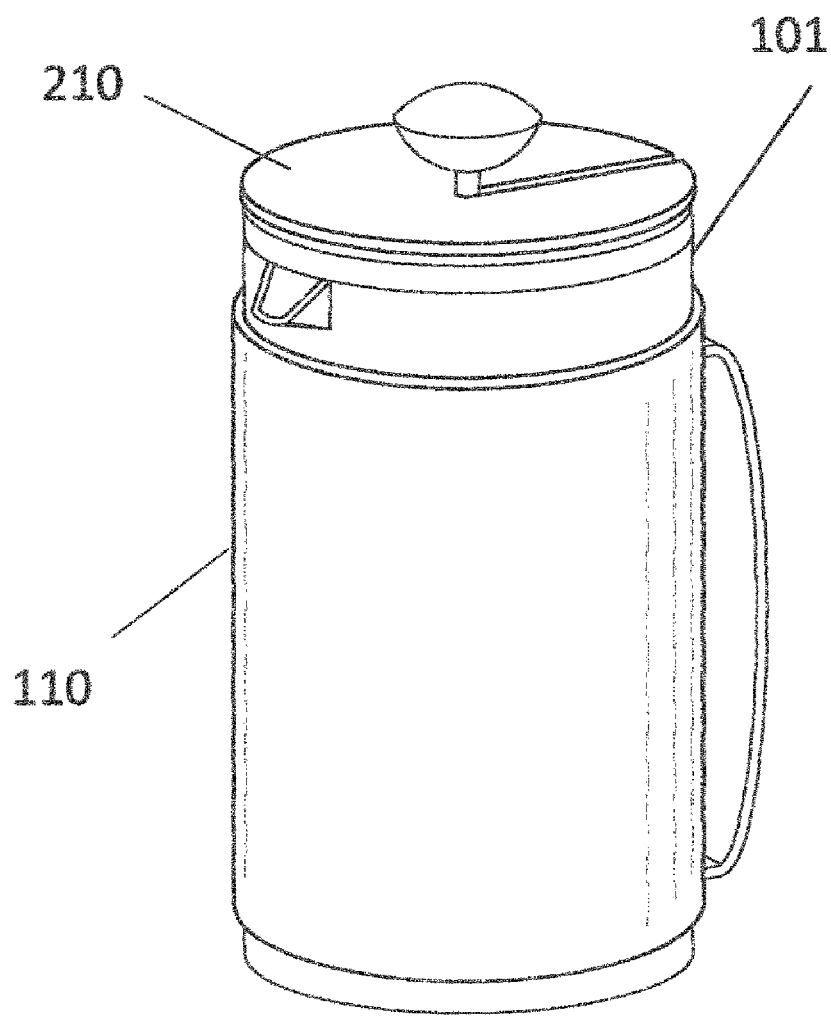
FIG. 3 is an in-use view of the thermal cover device of the present invention.

Referring now to FIG. 1-3, the present invention features a thermal cover device 100 for a coffee press 101. The device 100 comprises an elongated panel 110 having an outer surface, an inner surface, a first side edge, a second side edge, a top edge, and a bottom edge. The panel 110 is designed to wrap around the coffee press 101. The panel 110 can be secured around the coffee press 101 via an attachment means (e.g., a hook mechanism, a snap mechanism, a hook-and-loop fastener mechanism 120, a magnet mechanism, the like, or a combination thereof).

Disposed in the first side edge and/or the second side edge of the panel 110 are one or more first slots 130. The first slots 130 are sized so as to accommodate the handle of the coffee press 101 when the panel 110 is wrapped around the press 110.

The device 100 of the present invention further comprises a circular top panel 210 having a top surface, a bottom surface, and an outer edge. The circular top panel 210 is adapted to be attached to the top of the coffee press 101. A second slot 220 is disposed in the circular panel 210 for snugly accommodating the lid handle disposed on most coffee press tops (see FIG. 3).

Referring now to FIG. 2, the panel 110 and the top panel 210 may be constructed from a plurality of layers. For example, in some embodiments, the panels 110, 210 comprise a first batting layer 150a and a second batting layer 150b sandwiched between a first outer layer 160a and a second outer layer 160b. In some embodiments, an insulation layer 170 is sandwiched between the batting layers 150a, 150b. In some embodiments, the batting layers comprise a material comprising a cotton. In some embodiments, the insulation layer 170 is constructed from a material comprising a reflective insulation or a reflective foil. Such materials are well known to one of ordinary skill in the art. For example, in some embodiments, the insulation layer 170 is constructed from an EagleShield™ insulation component (EagleShield™, Dublin, Calif.), such as the High Performance Radiant Barrier Reflective Insulation. Without wishing to limit the present invention to any theory or mechanism, it is believed that the combined batting layers and insulation layer help retain heat longer.

The device 100 of the present invention may be constructed in a variety of sizes, styles, colors, and designs. For example, in some embodiments, the panel 110 is between about 6 to 8 inches in height as measured from the top edge to the bottom edge. In some embodiments, the panel 110 is between about 8 to 10 inches in height as measured from the top edge to the bottom edge. In some embodiments, the panel 110 is between about 10 to 12 inches in height as measured from the top edge to the bottom edge. In some embodiments, the panel 110 is more than about 12 inches in height.

In some embodiments, the panel 110 is between about 10 to 12 inches in length as measured from the first side edge to the second side edge. In some embodiments, the panel 110 is between about 12 to 14 inches in length as measured from the first side edge to the second side edge. In some embodiments, the panel 110 is more than about 14 inches in length.

As used herein, the term "about" refers to plus or minus 10% of the referenced number. For example, an embodiment wherein the panel 110 is about 10 inches in length includes a panel 110 that is between 9 and 11 inches in length.

The disclosures of the following U.S. patents are incorporated in their entirety by reference herein: U.S. Pat. No. 5,570,623; U.S. Pat. No. 6,295,920; U.S. Pat. No. 5,680,944; U.S. Pat. No. 6,079,316; U.S. Pat. No. 5,809,867.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A thermal cover device for a coffee press, said device comprising:

(a) an elongated panel for wrapping around the coffee press, the elongated panel has a first side edge, a second side edge, a top edge, and a bottom edge, wherein a first attachment means is disposed on the panel for securing the panel around the coffee press and a first slot disposed in the first side edge or the second side edge of the panel, the first slot is sized to accommodate a handle of the coffee press; and (b) a circular top panel adapted to be attached to a top of the coffee press, wherein a second slot is disposed in the circular panel for snugly accommodating a lid handle disposed the top of the coffee press;

wherein the panel and the top panel are constructed from at least a first batting layer and a second batting layer sandwiched between a first outer layer and a second outer layer, wherein an insulation layer is sandwiched between the first batting layer and the second batting layer, the insulation layer is constructed from a material comprising a reflective insulation or a reflective foil.

2. The device of claim 1, wherein the first attachment means is a hook mechanism, a snap mechanism, a hook-and-loop fastener mechanism, a magnet mechanism, the like, or a combination thereof.

3. The device of claim 1, wherein the batting layers comprise a material comprising a cotton.

4. The device of claim 1, wherein the insulation layer is constructed from a radiant barrier reflective insulation component.

* * * * *